Figure 1:
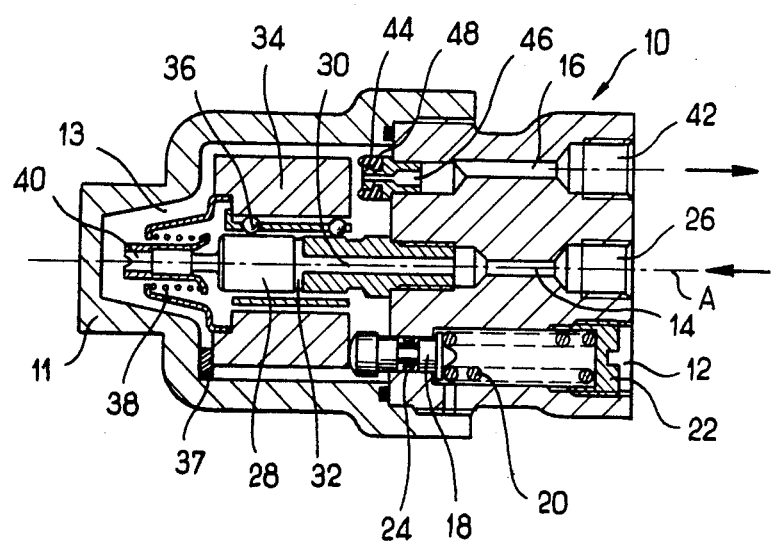

United States Patent

Carre et al.

[11] Patent Number: 4,673,223
[45] Date of Patent: Jun. 16, 1987

[54] DECELERATION RESPONSIVE BRAKING CORRECTOR

[75] Inventors: Jean-Jacques Carre, Le Raincy; Roland Levrai, Stains, both of France

[73] Assignee: Bendix France, Paris, France

[21] Appl. No.: 800,173

[22] Filed: Nov. 20, 1985

[30] Foreign Application Priority Data

Nov. 21, 1984 [FR] France .................. 84 17728
Jun. 20, 1985 [FR] France .................. 85 09369

[51] Int. Cl.$^4$ .................. B60T 8/28; B60T 8/14
[52] U.S. Cl. .................. 303/24 C; 303/24 F
[58] Field of Search .................. 303/24 A, 24 F, 24 C, 303/24 R, 6 C, 6 R, 24 B, 24 BB, 22 R, 22 A; 188/349, 195

[56] References Cited

U.S. PATENT DOCUMENTS

| | | | |
|---|---|---|---|
| 3,476,443 | 11/1969 | Bratten et al. | 303/24 C |
| 3,795,424 | 3/1974 | Lewis | 303/6 C |
| 3,825,303 | 7/1974 | Yabuta | 303/24 C X |
| 3,881,786 | 5/1975 | Stelzer et al. | 303/24 F |
| 3,888,546 | 6/1975 | Stordahl, Jr. | 303/24 C X |
| 3,950,037 | 4/1976 | Pembleton et al. | 303/24 F |
| 4,334,712 | 6/1982 | Carre et al. | 303/24 C |
| 4,431,235 | 2/1984 | Cheron et al. | 303/24 C |
| 4,516,810 | 5/1985 | Carré | 303/24 F |

FOREIGN PATENT DOCUMENTS

| | | | |
|---|---|---|---|
| 0019509 | 11/1980 | European Pat. Off. | |
| 0109893 | 5/1984 | European Pat. Off. | |
| 2736052 | 5/1973 | Fed. Rep. of Germany. | |
| 3238132 | 4/1984 | Fed. Rep. of Germany. | |
| 2468491 | 5/1981 | France. | |
| 0004168 | 1/1978 | Japan | 303/24 F |
| 1437415 | 5/1976 | United Kingdom | 303/24 F |
| 1526692 | 9/1978 | United Kingdom | 303/24 F |
| 2097080 | 10/1982 | United Kingdom. | |

Primary Examiner—Douglas C. Butler
Attorney, Agent, or Firm—Larry J. Palguta; Ken C. Decker

[57] ABSTRACT

Braking corrector dependent upon deceleration, for the braking system of a vehicle, comprising a body (10, 11) defining a chamber (13), an inlet port (26) connected to the chamber (13) and intended to be connected to a source of fluid under pressure, an outlet port (42) connected to the chamber (13) and intended to be connected to the brakes of the vehicle, a mass (34) which is slidably mounted in the chamber (13) and which is sensitive to the deceleration of the vehicle, a valve mechanism (44) capable of cooperating with the mass (34) so as to close the passage between the inlet port (26) and the outlet port (42) when the mass (34) moves under the effect of deceleration, a first spring mechanism (38) normally urging the mass (34) toward a rest position opening the passage between the inlet port (26) and the outlet port (42), and a second spring mechanism (20), characterized in that the second spring mechanism (20) is stronger than the first spring mechanism (38) and opposes the movement of the mass until a condition exists which is determined by a combination of the deceleration to which the mass is subjected and the pressure in the chamber.

17 Claims, 4 Drawing Figures

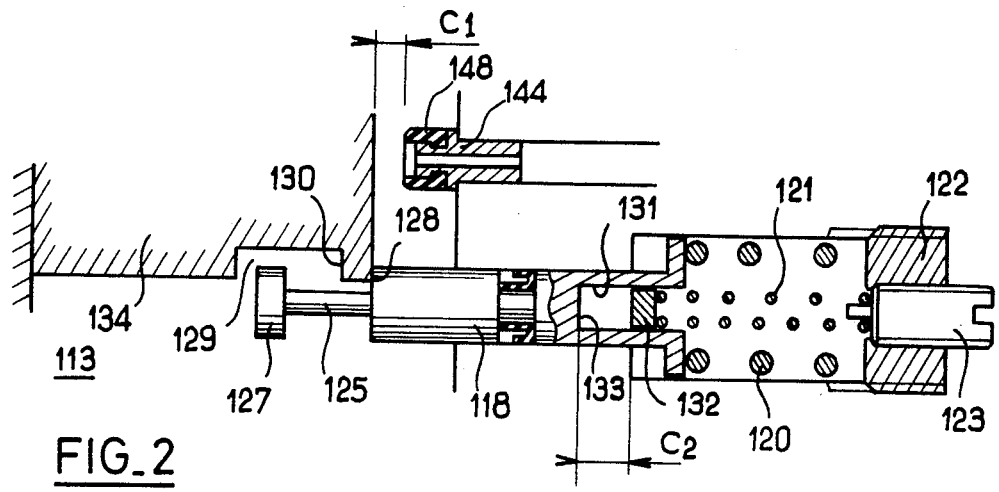
FIG_2
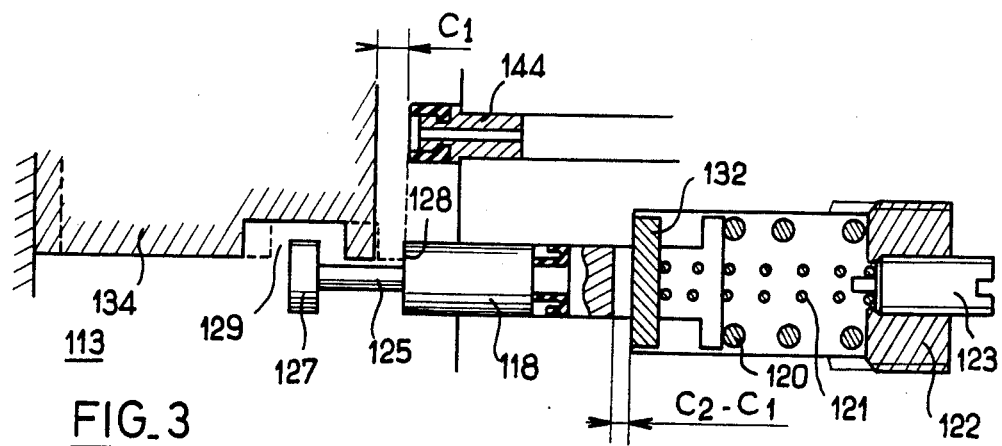
FIG_3
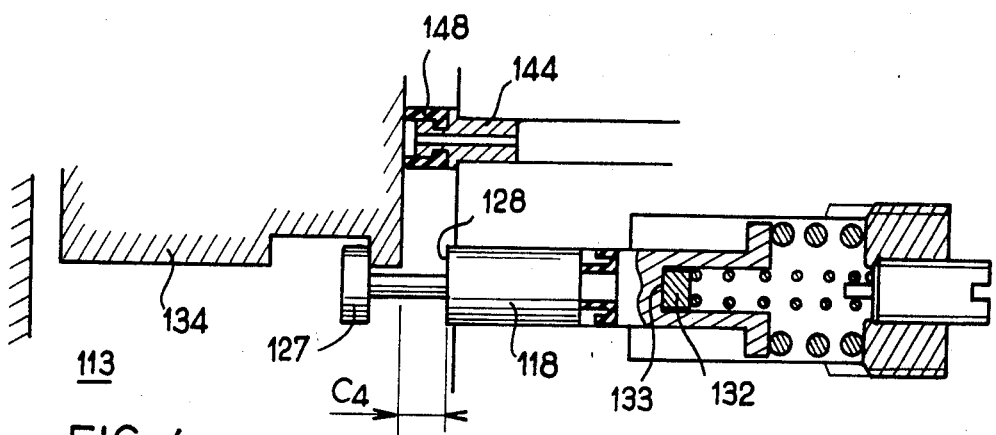
FIG_4

DECELERATION RESPONSIVE BRAKING CORRECTOR

The present invention relates to braking correctors which are responsive to the deceleration of the vehicle in which they are installed.

When braking a vehicle, it is desirable to limit the braking pressure of the rear wheels relative to that of the front wheels above a predetermined threshold of deceleration, the rear wheels being particularly liable to lock due to their reduced load.

The document EP-A-0,109,893 describes a twin-circuit braking corrector responsive to deceleration and which incorporates a rolling mass which is moveable at a low threshold of deceleration to close a valve and thus limit the braking pressure in the rear wheels. A piston urged by a spring is provided in the corrector to ensure the return of the rolling mass to its rest position and thus reopen the valve once braking is completed.

Despite its advantages, this corrector nevertheless has slight disadvantages in that it is only suitable for low thresholds of deceleration, and that the movement of the mass can be affected by the entry of hydraulic fluid into the corrector.

The object of the present invention is to propose a braking corrector responsible to the deceleration of the vehicle and which is suitable for higher thresholds of deceleration so as to suit modern vehicles whose road-holding is considerably improved and in which movement of the mass is controlled so as to accurately determine the thresholds of deceleration.

In accordance with the invention there is provided a deceleration responsive braking corrector, for the braking system of a vehicle, comprising a body defining a chamber, an inlet port connected to the chamber and intended to be connected to a source of fluid under pressure, an outlet port connected to the chamber and intended to be connected to the brakes of the vehicle, a mass slideably mounted in the chamber and responsive to the deceleration of the vehicle, a valve means capable of cooperating with the mass so as to close the passage between the inlet port and the outlet port when the mass moves under the effect of the deceleration of the vehicle, a first spring means normally urging the mass towards a rest position opening the passage between the inlet port and the outlet port, and a second spring means, characterised in that the second spring means is stronger than the first spring means and opposes the movement of the mass until a condition exists which is determined by a combination of the deceleration to which the mass is subjected and the pressure in the chamber.

Accordingly to a second embodiment of the invention a piston is provided between the second spring means and the mass and is adapted to actively engage the mass.

The present invention will now be described by way of example with reference to the accompanying drawings, in which :

FIG. 1 is a longitudinal section of a braking corrector according to a first embodiment of the invention; and FIGS. 2 to 4 are each a partial longitudinal section of a braking corrector according to a second embodiment of the invention, each showing a respective operating position.

As shown in FIG. 1, the braking corrector comprises a body 10 provided with three stepped bores 12,14,16.

A casing 11 is fixedly mounted on the body 10 and defines with it a chamber 13. In the first bore 12 a piston 18 is slideably mounted and is urged into abutment against a surface of an annular mass 34 under the effect of a spring 20. The spring 20 is maintained in position in the bore 12 by a screw 22 which also serves to adjust the calibration of the spring. The piston 18 also incorporates an annular seal 24.

The second bore 14 is provided with a threaded inlet port 26 which is intended to be connected to a source of fluid under pressure (not shown) for example a master cylinder. At the other end of the bore 14 a shaft element 28 is fixedly mounted and incorporates a longitudinal bore 30 connected to a transverse opening 32. The annular mass 34 is slideably mounted on the shaft component 28 by way of a ball bearing 36. The mass 34 is normally retained in its illustrated rest position against an abutment 37 by a spring 38, which is mounted at one end on the shaft 28 by an adjustable screw 40, and also under the effect of the piston 24.

The third bore 16 comprises a threaded outlet port 42 intended to be connected to the brakes of the rear wheels of the vehicle (not shown). At the other end of the bore 16 a valve seat 44 is mounted having a longitudinal bore 46 connecting the bore 16 to the chamber 13. The valve seat 44 includes an annular seal 48 which cooperates, when the mass 34 comes to bear against the valve seat, with the mass and closes the passage between the inlet port 26 and the rear brakes of the vehicle. The corrector is mounted in a vehicle in such a way that the longitudinal axis A of the corrector is parallel to that of the vehicle, the casing facing towards the rear.

The corrector described above operates as follows:

During a first phase of braking, as long as the combination of the deceleration and the pressure in the chamber 13 remains less than the predetermined threshold, the mass 34 remains at rest against the abutment 37 under the effect of the piston 18. Hydraulic fluid passes from the master cylinder through the bores 14, 30, the opening 32, and the bores 46, 16 towards the brakes of the vehicle. The hydraulic pressure in the chamber 13 rises and acts upon the surface of the piston 18. When the pressure exceeds a predetermined threshold the piston 18 moves to the right, looking at the drawing, under the influence of the pressure differential to which it is subject. If the deceleration then exceeds a predetermined threshold which, in the case of vehicles for which the invention is intended, is of the order of 0.7 to 0.85 g, the mass then moves to the right, looking at the Figure, and closes the valve 44. The hydraulic pressure in the brakes of the rear wheels remains constant after the closure of the valve 44 and the risk of the rear wheels skidding is thus reduced to a minimum.

Once the vehicle has stopped, and the brake pedal has been released, the pressure in the chamber 13 falls and the piston 18 moves to the left under the effect of the spring and the mass can recover its rest position under the combined effect of the springs 20 and 38.

The fact that the transverse opening 32 is situated inside the annular mass 34 ensures free movement of the mass once the threshold is exceeded. The flow of fluid is also distributed over the mass so that the risk of eddies and turbulence, which could undesirably impede or assist the movement of the mass 34, is reduced to a minimum.

In practice, the spring 20 is very considerably stronger than the return spring 38, typically of the order of 10 to 20 times stronger. As mentioned above, a device according to the invention is particularly suitable for high speed vehicles provided with powerful braking systems which in use are thus subject to high braking decelerations.

Adjustment of the closing pressure of the corrector is carried out as follows : the casing 11 is first removed from the body 10 and the piston 18 is maintained in its closed position in the bore 12. The corrector is then placed in an inclined position so that the force to which the mass 34 is subjected is equivalent to the deceleration force of the required threshold. The outlet port 42 is connected to a source of vacuum and the screw 40 is adjusted so as to obtain closure of the valve 44.

As the mass 34 is entirely immersed in hydraulic fluid the response time may be undesirably long. The second embodiment of the invention, as will be described below, includes modifications which shorten the response time.

As shown in FIG. 2 to 4, a braking corrector similar to that of FIG. 1 comprises a piston 118 urged to the left (when viewing the drawings) by two springs 120-121 which are respectively and independently adjustable by two screws 122-123. At its end remote from the spring 120-121, the piston 118 has a portion of reduced cross-section 125 which terminates in a head 127. The piston 118 also has an abutment surface 128 adjacent the portion 125. The mass 134 has an internal circumferential groove 129, limited at an end adjacent the piston 118 by an abutment surface 130. The piston 118 also includes a longitudinally extending slot 131 in which is slideably received a pin 132 which is urged to the left by spring 121. The drawings show four dimensions $C_1$, $C_2$, $C_3$, $C_4$, which together determine the operating characteristics of the corrector and are defined as follows:

$C_1$ is a displacement of the mass 134 necessary to come into contact with, and close, the valve 144;

$C_2$ is the free displacement of the piston 118 to the right before an internal surface 133 on the piston comes into contact with the pin 132;

$C_4$ is the relative displacement between the abutment surface 128 and the mass 134; and $C_3 = C_4 + C_1$.

The operation of the corrector in each of three different situations will now be described.

In FIG. 2 the corrector is shown in its rest position. The valve 144 is open because the abutment surface 128 is in contact with the mass 134 which is urged into its extreme leftward position by spring 120. Thus piston 118 prevents the displacement of the mass 134 and hence the untimely closure of valve 144 below a predetermined pressure level, determined by the force of spring 120 as in the embodiment of FIG. 1. It is clear from the drawing that $C_1 < C^2$.

The position adopted by the corrector during braking of the vehicle is illustrated in FIG. 3.

The increase in hydraulic pressure in chamber 113 displaces the piston 118 to the right against the force of spring 120. In this position the mass 134 is free to move to the right under inertial forces during deceleration and close valve 144, as is the case with the embodiment of FIG. 1. Further displacement of piston 118 through a distance of $C_2$ brings the internal surface 133 into contact with pin 132 with the result that further rightward movement of the piston 118 must counteract the force of both springs 120 and 121.

Once the piston 118 has moved through a distance of $C_3$ it adopts the position shown in FIG. 4. In this position the head 127 of the piston 118 engages the abutment surface 130 of the mass 134 and moves the mass into its closed position against seal 148 of the valve 144. The closure of valve 144 under these circumstances is independent of the deceleration of the vehicle and is solely produced by the increase in hydraulic pressure in chamber 113 which displaces piston 118. Thus the corrector limits the braking pressure to a valve determined by the calibration of springs 120 and 121.

We claim:

1. A deceleration-responsive braking corrector for the braking system of a vehicle, comprising a body defining a chamber, an inlet port to be connected to a source of fluid pressure, an outlet port connected with the chamber and intended to be connected with brakes of the vehicle, a passage between the ports and communicating with the chamber, a mass mounted slidably in the chamber and responsive to deceleration of the vehicle, valve means capable of cooperating with the mass to close the passage between the ports when the mass moves under the effect of the deceleration of the vehicle, first spring means normally urging the mass in one direction toward a rest position and opening the passage between the ports, and second spring means disposed within the body, characterized in that the first spring means and second spring means both urge the mass in the one direction toward the rest position and opening the passage, the body including a bore having a piston disposed slidably therein, the piston having a seal thereabout and biased by the second spring means into engagement with the mass, and the mass mounted slidably on a shaft having therein an opening, the opening forming a part of the passage between the ports.

2. The deceleration-responsive braking corrector in accordance with claim 1, wherein the piston includes a groove and the seal disposed therein for slidable engagement with the bore.

3. The deceleration-responsive braking corrector in accordance with claim 1, wherein the valve means comprises a valve seat having thereabout an annular seal which can engage the mass to sealingly close a portion of the passage communicating with the outlet port.

4. The deceleration-responsive braking corrector in accordance with claim 1, further comprising a screw disposed in the body and engaging the second spring means.

5. The deceleration-responsive braking corrector in accordance with claim 1, wherein the shaft includes adjustable screw means, the first spring means engaging the adjustable screw means which positions the first spring means for biasing the mass in the one direction.

6. The deceleration-responsive braking corrector in accordance with claim 5, wherein the adjustable screw means is mounted on the shaft and has a flanged end which forms an abutment for one end of the first spring means.

7. The deceleration-responsive braking corrector in accordance with claim 6, wherein the mass includes a cup mounted thereon, the cup having an end opening through which extends the adjustable screw means.

8. The deceleration-responsive braking corrector in accordance with claim 1, wherein ball bearings slidably mount the mass on the shaft.

9. The deceleration-responsive braking corrector in accordance with claim 8, wherein the mass includes an end cup having an opening through which extends screw means connected with the shaft.

10. A deceleration-responsive braking corrector for the braking system of a vehicle, comprising a body defining a chamber, an inlet port to be connected to a source of fluid pressure, an outlet port connected with the chamber and intended to be connected with brakes of the vehicle, a passage between the ports and communicating with the chamber, a mass mounted slidably in the chamber and responsive to deceleration of the vehicle, valve means capable of cooperating with the mass to close the passage between the ports when the mass moves under the effect of the deceleration of the vehicle, first spring means normally urging the mass in one direction toward a rest position and opening the passage between the ports, and second spring means disposed within the body, characterized in that the first spring means and second spring means both urge the mass in the one direction toward the rest position and opening the passage, the body including a bore having a piston disposed slidably therein, the piston having a seal thereabout and biased by the second spring means into engagement with the mass, the second spring means comprising two coaxial springs, and the mass mounted slidably on a shaft having therein an opening, the opening forming a part of the passage between the ports.

11. The deceleration-responsive braking corrector in accordance with claim 10, further comprising adjustable screw means disposed in the body and engaging one of the two coaxial springs.

12. The deceleration-responsive braking corrector in accordance with claim 11, wherein the bore includes a pin disposed therein and extending through a transverse opening in the piston.

13. The deceleration-responsive braking corrector in accordance with claim 12, wherein the bore is closed at one end by a screw receiving therein the adjustable screw means, the screw positioning an end of the other coaxial spring.

14. The deceleration-responsive braking corrector in accordance with claim 12, wherein the one coaxial spring engages the pin and biases the pin toward a shoulder of the bore.

15. The deceleration-responsive braking corrector in accordance with claim 10, wherein ball bearings slidably mount the mass on the shaft.

16. A deceleration-responsive braking corrector for the braking system of a vehicle, comprising a body defining a chamber, an inlet port to be connected to a source of fluid pressure, an outlet port connected with the chamber and intended to be connected with brakes of the vehicle, a passage between the ports and communicating with the chamber, a mass mounted slidably in the chamber and responsive to deceleration of the vehicle, valve means capable of cooperating with the mass to close the passage between the ports when the mass moves under the effect of the deceleration of the vehicle, first spring means normally urging the mass in one direction toward a rest position and opening the passage between the ports, and second spring means disposed within the body, characterized in that the first spring means and second spring means both urge the mass in the one direction toward the rest position and opening the passage, the body including a bore having a piston disposed slidably therein, the piston having a seal thereabout and biased by the second spring means into engagement with the mass, the second spring means comprising two coaxial springs, one of the two coaxial springs located within the other of the two coaxial springs, the mass including a groove having an abutment, and the piston having a head disposed in the groove.

17. The deceleration-responsive braking corrector in accordance with claim 16, further comprising an adjustable screw disposed in the body and engaging the second spring means.

* * * * *